(12) United States Patent
Niwano

(10) Patent No.: US 7,953,124 B2
(45) Date of Patent: May 31, 2011

(54) MOBILE STATION, BASE STATION, COMMUNICATION SYSTEM, AND COMMUNICATION METHOD

(75) Inventor: Kazuhito Niwano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 613 days.

(21) Appl. No.: 11/980,602

(22) Filed: Oct. 31, 2007

(65) Prior Publication Data

US 2008/0069057 A1    Mar. 20, 2008

Related U.S. Application Data

(62) Division of application No. 11/033,824, filed on Jan. 13, 2005, now abandoned, which is a division of application No. 10/472,493, filed as application No. PCT/JP02/08435 on Aug. 21, 2002, now Pat. No. 7,289,423.

(30) Foreign Application Priority Data

Jan. 29, 2002   (JP) .................................. 2002-20465

(51) Int. Cl.
  *H04J 3/04* (2006.01)
  *H04J 3/00* (2006.01)
  *H04J 3/12* (2006.01)
  *H04J 11/00* (2006.01)

(52) U.S. Cl. ........ 370/535; 370/203; 370/522; 370/527; 370/529

(58) Field of Classification Search ........................ None
See application file for complete search history.

(56) References Cited

U.S. PATENT DOCUMENTS

| | | | |
|---|---|---|---|
| 6,108,369 A | 8/2000 | Ovesjo et al. | |
| 6,574,210 B2 | 6/2003 | Odenwalder et al. | |
| 7,102,993 B2 | 9/2006 | Niwano | |
| 7,145,863 B2 | 12/2006 | Niwano | |
| 7,307,943 B2 | 12/2007 | Niwano | |
| RE40,777 E * | 6/2009 | Jarbot et al. ................. | 370/465 |
| 2002/0085619 A1 | 7/2002 | Cho et al. | |
| 2002/0141367 A1 | 10/2002 | Hwang et al. | |
| 2002/0183037 A1 | 12/2002 | Griffin et al. | |
| 2004/0085936 A1 | 5/2004 | Gopalakrishnan et al. | |
| 2005/0243763 A1* | 11/2005 | Toskala et al. ............... | 370/328 |

FOREIGN PATENT DOCUMENTS

| | | |
|---|---|---|
| CN | 1204193 A | 1/1999 |
| EP | 1 089 458 | 4/2001 |
| JP | 10-341188 | 12/1998 |
| JP | 11-154904 | 6/1999 |
| JP | 11-275059 | 10/1999 |
| JP | 2000-165350 | 6/2000 |
| JP | 2001-267959 | 9/2001 |
| JP | 2001-285252 | 10/2001 |
| JP | 2001-308746 | 11/2001 |
| JP | 2002-369258 | 12/2002 |
| WO | WO 01/91395 | 11/2001 |

OTHER PUBLICATIONS

U.S. Appl. No. 11/980,445, filed Oct. 31, 2007, Niwano.

(Continued)

*Primary Examiner* — Kwang B Yao
*Assistant Examiner* — Jutai Kao
(74) *Attorney, Agent, or Firm* — Oblon, Spivak, McClelland, Maier & Neustadt, L.L.P.

(57) ABSTRACT

A scrambler performs IQ multiplexing of output signals from a spreader and a distributor in order to generate a complex signal (I signal and Q signal), amplitude coefficients $\beta cc(I)$ and $\beta cc(Q)$ are determined in accordance with signal powers on I axis and Q axis.

2 Claims, 20 Drawing Sheets

OTHER PUBLICATIONS

"Universal Mobile Telecommunications System (UMTS): Spreading and modulation (FDD) (3GPP TS 25.213 version 3.6.0 Release 1999)." ETSI TS 125 213 v3.6.0 (Jun. 2001) Technical Specification. 1999. pp. 1-27.

Ericsson, http://www.3gp.org/ffp/tsg_ran/WG1_RL1/TSGR1_04/Docs/Pdfs/R1-99347.PDF, XP-002167844, 6 pages, "Amplitude Differences Between UplinK DPCCH and DPDCHS", Apr. 18-20, 1999.

"3rd Generation Partnership Project: Technical Specification Group Radio Access Network; High Speed Downlink Packet Access: Physical Layer Aspects (Release 5)" 3GPP TR 25.858 V1.0.0, Dec. 2001.

* cited by examiner

BACKGROUND ART

| Signalling values for $\beta_c$ and $\beta_d$ | Quantized amplitude ratios $\beta_c$ and $\beta_d$ |
|---|---|
| 15 | 1.0 |
| 14 | 14/15 |
| 13 | 13/15 |
| 12 | 12/15 |
| 11 | 11/15 |
| 10 | 10/15 |
| 9 | 9/15 |
| 8 | 8/15 |
| 7 | 7/15 |
| 6 | 6/15 |
| 5 | 5/15 |
| 4 | 4/15 |
| 3 | 3/15 |
| 2 | 2/15 |
| 1 | 1/15 |
| 0 | Switch off |

BACKGROUND ART

BACKGROUND ART

MOBILE STATION, BASE STATION, COMMUNICATION SYSTEM, AND COMMUNICATION METHOD

CROSS-REFERENCE TO RELATED APPLICATIONS

This application is a divisional of and claims the benefit of priority from U.S. application Ser. No. 11/033,824, filed Jan. 13, 2005, which is a divisional of U.S. application Ser. No. 10/472,493, filed Sep. 30, 2003, which is a National Stage of PCT/JP02/08435, filed Aug. 21, 2002 and is based upon and claims the benefit of priority from prior Japanese Patent Application No. 2002-20465, filed Jan. 29, 2002, the entire contents of all of which are incorporated herein by reference.

TECHNICAL FIELD

The present invention relates to a mobile station, a base station, a communication system, and a communication method which are capable of performing data communication with high speed.

BACKGROUND ART

The ITU (International Telecommunication Union) has adopted plural wireless communication methods called the $3^{rd}$ generation as IMT-2000 for mobile wireless communication method typically used in the field of cellular phones. In Japan W-CDMA (Wideband Code Division Multiple Access) method as one of them is commercially available from 2001.

W-CDMA is made to obtain a communication speed of the maximum 2 Mbps (bit per second) per mobile station. The 3GPP ($3^{rd}$ Generation Partnership Project) as one of standardization groups has determined the specification of the first edition as Release 99 version (Release 1999) which was summarized at 1999.

FIG. 1 is a general schematic diagram of a conventional communication system. In FIG. 1, reference number 1 designates a base station, and 2 denotes a mobile station performing a wireless communication with the base station 1. Reference number 3 indicates a downlink for use in data transmission from the base station 1 to the mobile station 2, and 4 indicates an uplink for use in data transmission from the mobile station 2 to the base station 1.

FIG. 2 is a diagram showing an internal configuration of the mobile station 2. In FIG. 2, reference number 11 designates a distributor for distributing data DPDCH of a dedicated data channel (Dedicated Physical Data Channel) in parallel and outputting obtained data DPDCH1-DPDCH6 of plural data channels. Reference number 12 denotes a spreader for performing a spread spectrum process for data DPDCH1-DPDCH6 output from the distributor 11 and control data DPCCH of a control channel (Dedicated Physical Control Channel). The spreader 12 multiplies the data DPDCH1-DPDCH6 and the control data DPCCH by spreading codes for channel separation.

Reference number 13 indicates a scrambler for generating a complex signal (I signal: Inphase signal, Q signal: Quadrature signal) by performing IQ multiplexing for output signals from the spreader 12. Reference number 14 denotes a modulator for generating a modulated signal by performing orthogonal modulation of a complex signal (I signal and Q signal) generated at the scrambler 13. Reference number 15 indicates a frequency converter for converting in frequency the modulated signal generated at the modulator 14 to a radio frequency signal. Reference number 16 designates an antenna for transmitting the radio frequency signal output from the frequency converter 15.

FIG. 3 is a diagram showing an internal configuration of the spreader 12 and the scrambler 13. In FIG. 13, reference numbers 21 to 26 indicate multipliers for multiplying the data DPDCH1-DPDCH6 output from the distributor 11 by spreading codes Cd,1 to Cd,6 for use in channel separation. Reference numbers 27 designates a multiplier for multiplying the control data DPCCH of the control channel by a spreading code Cc for use in channel separation. Reference number 31 to 36 denote multipliers for multiplying the output signals from the multipliers 21 to 26 by an amplitude coefficient βd for the data DPDCH. Reference number 37 designates a multiplier for multiplying the output signal from the multiplier 27 by an amplitude coefficient βc for the control data DPCCH.

Reference number 38 denotes an adder for adding the output signals from the multipliers 31 to 33, and 39 denotes an adder for adding the output signals from the multipliers 34 to 37.

Reference number 40 denotes a multiplier for multiplying the output signal from the adder 39 by imaginary number "j", 41 indicates adder for adding the output signals from the adder 38 and the multiplier 40. Reference number 42 designates a multiplier for multiplying the output signal from the adder 41 by an identification code Sdpch,n for a cellular station in order to generate the complex signal (I signal and Q signal), and then outputting the generated complex signal.

Next, a description will be given of the operation of the conventional communication system in which data are transmitted from the mobile station 2 to the base station 1.

When transmitting data to the base station 1, as shown in FIG. 1, the mobile station 2 uses the uplink 4 for the transmission data. In W-CDMA standard, when using the uplink 4, the mobile station 2 can use maximum six channels for the transmission data according to a communication speed required in communication service.

In the following explanation, data on six data channels and control data for one control channel are transmitted for brief explanation.

First, the distributor 11 in the mobile station 2 distributes the data DPDCH of the dedicated data channel in parallel and outputs the data DPDCH1-DPDCH6 for the plural data channels.

When the distributor 11 outputs the data DPDCH1-DPDCH6 for the plural data channels, the multipliers 21-26 in the spreader 12 multiply these data DPDCH1-DPDCH6 with the spreading codes Cd,1-Cd,6 for channel separation. The multiplier 27 in the spreader 12 multiplies the control data DPCCH for the control channel by the spreading code Cc for channel separation.

The scrambler 13 performs IQ multiplexing for the output signal from the spreader 12 in order to generate the complex signal (I signal and Q signal).

That is, the multipliers 31-36 in the scrambler 13 multiply the output signals from the multipliers 21-26 in the spreader 12 by the amplitude coefficient βd. The multiplier 37 in the scrambler 13 multiplies the output signal from the multiplier 27 by the amplitude coefficient βc for the control data DPCCH.

FIG. 4 is a diagram showing a table of possible values of the amplitude coefficients βc and βd.

The amplitude coefficients βd and βc are coefficients for use in the determination of a power ratio between the data DPDCH1-DPDCH6 and the control data DPCCH, which have been defined in TS25.213 v3.6.0 (2001-06) Release 1999 in 3GPP standard. Right side in this table shows the possible values of the amplitude coefficients βc and βd.

The adder 38 in the scrambler 13 adds the output signals from the multipliers 31-33 and the adder 39 in the scrambler 13 adds the output signals from the multipliers 34-37.

The multiplier 40 in the scrambler 13 multiplies the output signal from the adder 39 by imaginary number "j" so as to assign the output signal from the adder 39 to Q axis.

The data DPDCH1, DPDCH3, and DPDCH5 are assigned on I axis and the data DPDCH2, DPDCH4, and DPDCH6 are assigned on Q axis.

TS25.213 in 3GPP Standard Defines how to Assign Data Channels on I Axis/Q Axis.

Next, the adder 41 in the scrambler 13 adds the output signals from the adder 38 and the multiplier 40. The multiplier 42 in the scrambler 13 multiplies the output signal from the adder 41 by an identification code Sdpch,n to be used to identify a dedicated mobile station, and then outputs the complex signal (I signal and Q signal).

When the scrambler 13 generates the complex signal (I signal and Q signal) in such a manner described above, the modulator 14 performs the orthogonal modulation for the complex signal (I signal and Q signal) so as to generate the modulated signal.

When the modulator 14 generates the modulated signal, the frequency converter 15 converts this modulated signal in frequency, generates the radio frequency signal, and amplifies and outputs the generated one to the antenna 16. Through the antenna 16 the radio frequency signal is transmitted to the base station 1.

When receiving the radio frequency signal transmitted from the mobile station 2, the base station 1 performs inverse processes to the processes in the mobile station 1 in order to obtain the necessary data.

The above conventional case has explained the case to set the six data channels. When the set number of the data channels is not more than 5, no process for unnecessary data channel is performed because the data are assigned on I axis and Q axis in the order of increasing data number, for example, the data DPDCH1 is firstly assigned and the data DPDCH2 is then assigned. The set number of the data channels is determined based on the communication service and the communication speed.

FIG. 5 is a diagram showing a complex plane of only one data channel.

In this case, the data DPDCH1 for the data channel is assigned on I axis and the control data DPCCH for the control channel is assigned on Q axis. Because the data DPDCH1 and the control data DPCCH are orthogonal to each other, the base station 1 can separate the received data in channel and then demodulate the separated data.

It is possible to perform the same operation for the case where the set number of the data channels is 2, 3, 4, 5, or 6. In this case, the channel component in the same axis can be separated using the spreading code for channel separation.

The above conventional example has described the case to set the downlinks 3 and the uplink 4 between the base station 1 and the mobile station 2. In order to achieve a further high speed data communication in the downlink from the base station 1 to the mobile station 2, HSDPA (High Speed Downlink Packet Access) has been proposed and examined (see TR25.858 v1.0.0 (2001-06) "High Speed Downlink Packet Access: Physical Layer Aspects (Release 5)".

FIG. 6 shows HSDPA in which a new downlink 5 is added in addition to the downlink 3 in the conventional case.

In the addition of the new downlink 5, it has been examined that the mobile station 2 transmits a response data (ACK/NACK) and the like to the high speed packet data in the downlink to the base station 1. However, as shown in FIG. 6 in which the response data (ACK/NACK) is transmitted through the exclusive control channel (as the uplink channel 6). Through the exclusive control channel the response data are separated and identified using the spreading code for channel separation, like the same manner for the conventional control channel, and then added and multiplexed in the conventional uplink 4. TR25.858 defines to describe "additional DPCCH" as the exclusive control channel.

Because the conventional communication system has the configuration described above, it is necessary to assign the additional exclusive control channel on I axis and Q axis. This causes a drawback where a distortion is generated at the built-in orthogonal modulator (or orthogonal modulator and amplifier) in the modulator 14 in the mobile station 2 because nonlinear section of input/output characteristic must be used, when the peak power of I axis or Q axis is increased by assigning the exclusive control channel to I axis or Q axis, for example.

When the balance between the signal powers of I axis and Q axis is decayed, the peak power of the modulated signal output from the modulator 14 after the orthogonal modulation is greater than the peak power of the modulated signal of the case where the signal powers of I axis and Q axis are in balance. For example, in case an amplifier incorporated in the frequency converter 15 in the mobile station 2 amplifies the radio frequency signal, a distortion occurs because the amplifier uses in amplification a non-linear part of the input/output characteristic thereof. When the non-linear component in the distortion generated in the amplifier is output, this non-linear component and the signal component of the frequency band adjacent to this linear component interfere to each other. The reception of the adjacent frequency band is thereby disturbed by jamming.

The present invention is made to overcome the above drawbacks. It is an object of the present invention is to provide a mobile station, a base station, a communication system, and a communication method which are capable of suppressing the generation of a distortion in amplifiers and thereby to suppress the occurrence of jamming in the adjacent frequency band.

DISCLOSURE OF INVENTION

In carrying out the invention and according to one aspect thereof, there is provided a mobile station capable of generating a complex signal by distributing control data of an additional control channel on I axis and Q axis, and performing IQ multiplexing for them in the case of adding control data of an additional control channel.

It is thereby possible to suppress the generation of a distortion in an amplifier and thereby to suppress the occurrence of jamming in the adjacent frequency band.

The mobile station according to the present invention distributes the control data for the additional control channel on I axis and Q axis in consideration of a signal power of I axis and a signal power of Q axis in the case of adding control data of an additional control channel.

It is thereby possible to suppress the generation of a distortion in the amplifier and thereby to suppress the occurrence of jamming in the adjacent frequency band.

The mobile station according to the present invention distributes the control data for the additional control channel on I axis and Q axis so that the signal power of I axis becomes equal to that of Q axis in the case of adding control data of an additional control channel.

It is thereby possible to suppress the generation of a distortion in the amplifier efficiently.

The mobile station according to the present invention assigns the control data for the additional control channel to one axis whose signal power is smaller than that of the other axis in I axis and Q axis in the case of adding control data of an additional control channel.

It is thereby possible to suppress the generation of a distortion in the amplifier with a simple configuration.

The mobile station according to the present invention assigns the control data for the additional control channel on Q axis when the number of data channels is an odd number, and assigns the control data on Q axis when it is an even number, in the case of adding control data of an additional control channel.

It is thereby possible to suppress the generation of a distortion in the amplifier with a simple configuration.

The mobile station according to the present invention assigns the control data for the additional control channel on Q axis in the case of adding control data of an additional control channel.

It is thereby possible to suppress the generation of a distortion in the amplifier and to have a circuit with a simple configuration.

A base station according to the present invention synthesizes control data for an additional control channel distributed on I axis and Q axis and outputs the synthesized one, when the control data for the additional control channel are distributed on I axis and Q axis.

It is thereby possible to suppress the generation of a distortion in the amplifier and to suppress the occurrence of jamming in the adjacent frequency band.

A communication system according to the present invention, in the case of adding control data of an additional control channel, IQ multiplexing means distributes the control data for the additional control channel on I axis and Q axis, performs IQ multiplexing, and outputs a complex signal. Further, IQ separation means in a base station synthesizes the control data for the additional control channel distributed on I axis and Q axis and outputs the synthesized one when the control data for the additional control channel are distributed on I axis and Q axis.

It is thereby possible to suppress the generation of a distortion in the amplifier and thereby to suppress the occurrence of jamming in the adjacent frequency band.

A communication method according to the present invention has the following steps in a case to add the control data for the additional control channel. In a mobile station, control data for an additional control channel are distributed on I axis and Q axis, IQ multiplexing is performed in order to generate a complex signal. In a base station, the control data distributed on I axis and Q axis are synthesized and output when the control data for the additional control channel are distributed on I axis and Q axis.

It is thereby possible to suppress the generation of a distortion in the amplifier and thereby to suppress the occurrence of jamming in the adjacent frequency band.

Other objects, features and advantages of the present invention will become apparent in the following description and appended drawings.

BEST MODE FOR CARRYING OUT THE INVENTION

The best mode for carrying out the invention will now be described in detail with reference to the accompanying drawings.

First Embodiment

Figure 1:
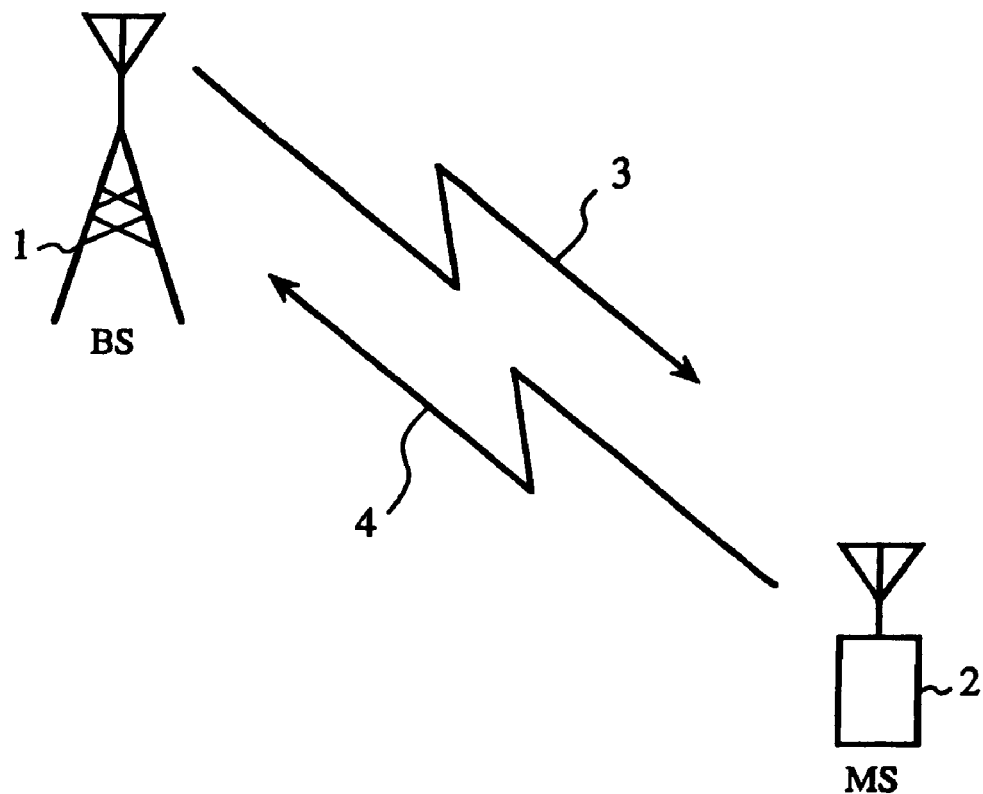
FIG. 1 is a schematic diagram of a conventional communication system.
Figure 2:
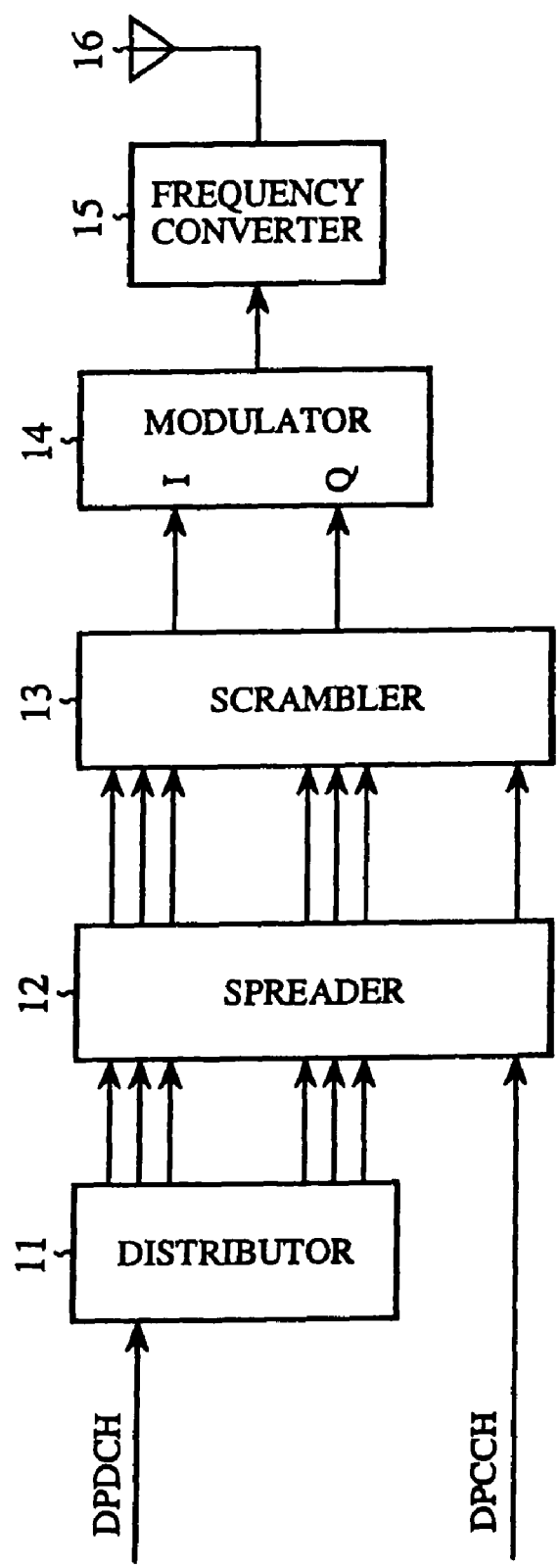
FIG. 2 is a diagram showing an internal configuration of a mobile station.
Figure 3:
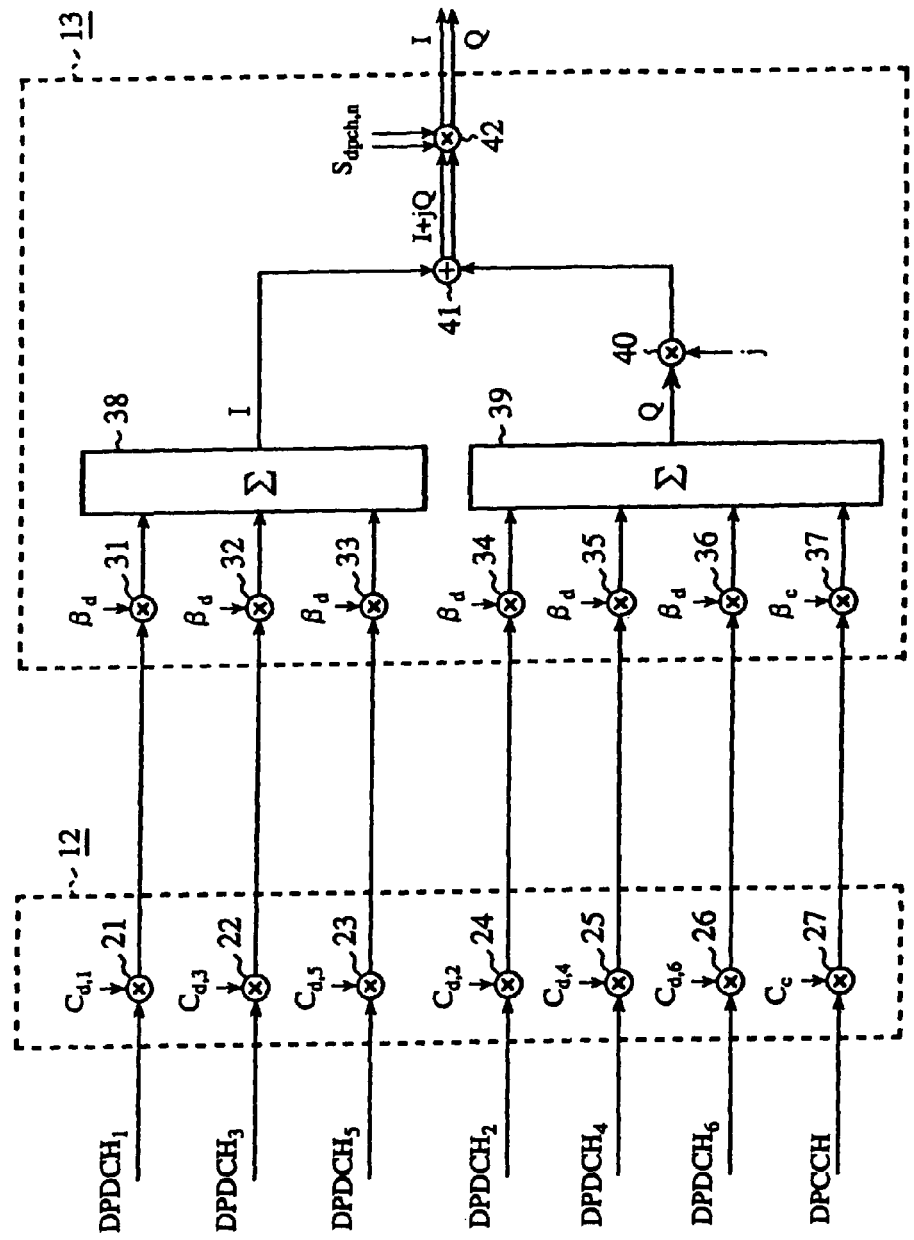
FIG. 3 is a diagram showing an internal configuration of a spreader and a scrambler.
Figures 4, 5:
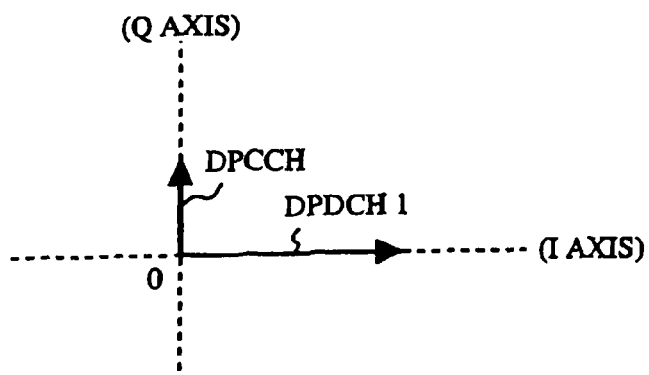
FIG. 4 is diagram showing a table of possible values of the amplitude coefficients βc and βd.
FIG. 5 is a diagram showing a complex plane in case of one data channel.
Figure 6:
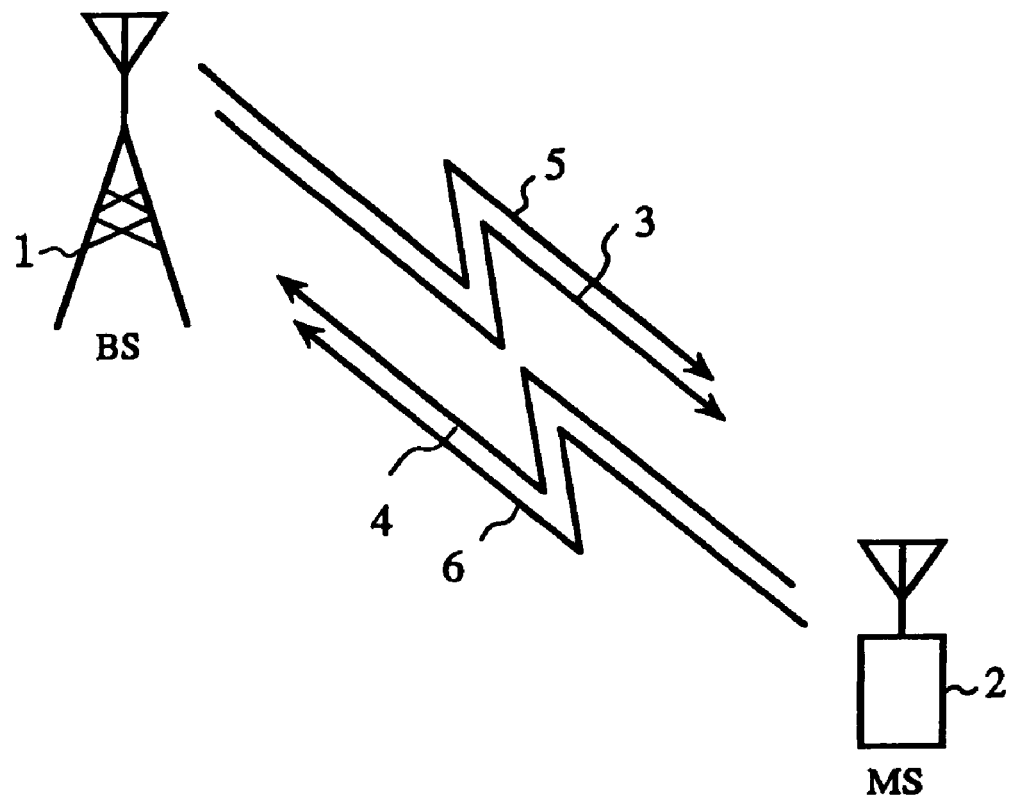
FIG. 6 is a schematic diagram showing a conventional communication system.
Figure 7:
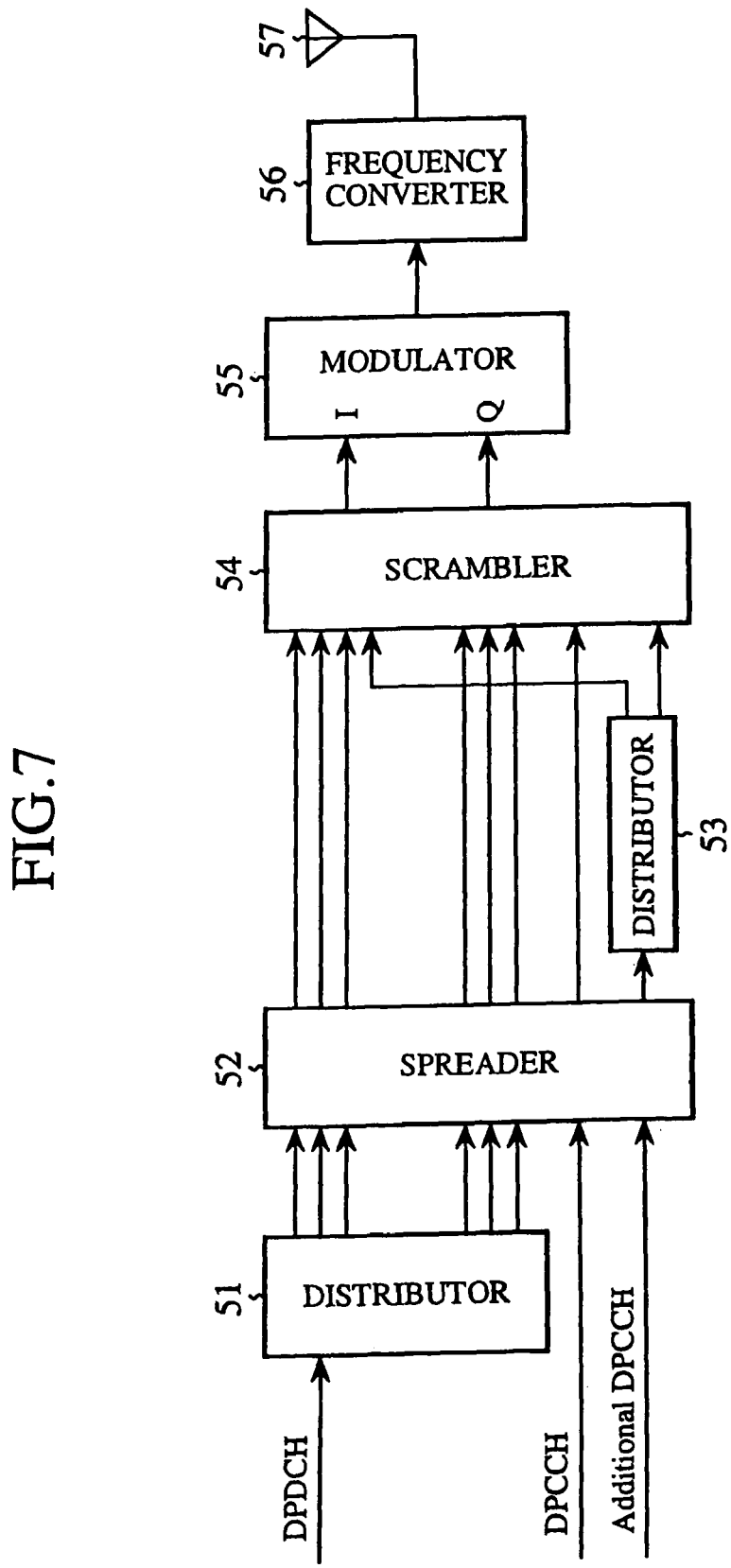
FIG. 7 is a diagram showing a configuration of a mobile station applicable to a communication system according to a first embodiment of the present invention.

FIG. 7 is a diagram showing a configuration of a mobile station applicable to a communication system according to a first embodiment of the present invention. In FIG. 7, reference number 51 designates a distributor for distributing data DPDCH in parallel and the outputting the distributed data DPDCH1-DPDCH6 in plural data channels. Reference number 52 denotes a spreader for performing a spread spectrum processes for the data DPDCH1-DPDCH6 output from the distributor 51 and control data DPCCH and ADPCCH (additional DPCCH) of control channels by multiplying those data DPDCH1-DPDCH6, and control data DPCCH and ADPCCH by spreading codes for use in channel separation.

Reference number 53 indicates a distributor for distributing the control data ADPCCH after the spread spectrum process performed by the spreader 52.

Reference number 54 indicates a scrambler for generating a complex signal (I signal and Q signal) by performing IQ multiplexing for the output signals from the spreader 52 and the distributor 53.

The IQ multiplexing means consists of the distributor 51, the spreader 52, the distributor 53, and the scrambler 54.

Reference number 55 denotes a modulator for generating a modulated signal by performing orthogonal modulation of the complex signal (I signal and Q signal) generated at the scrambler 54. Reference number 56 indicates a frequency converter for converting in frequency the modulated signal generated at the modulator 55 to a radio frequency signal. Reference number 57 designates an antenna for transmitting the radio frequency signal output from the frequency converter 56.

The transmitting means consists of the modulator 55, the frequency converter 56, and the antenna 57.

Figure 8:
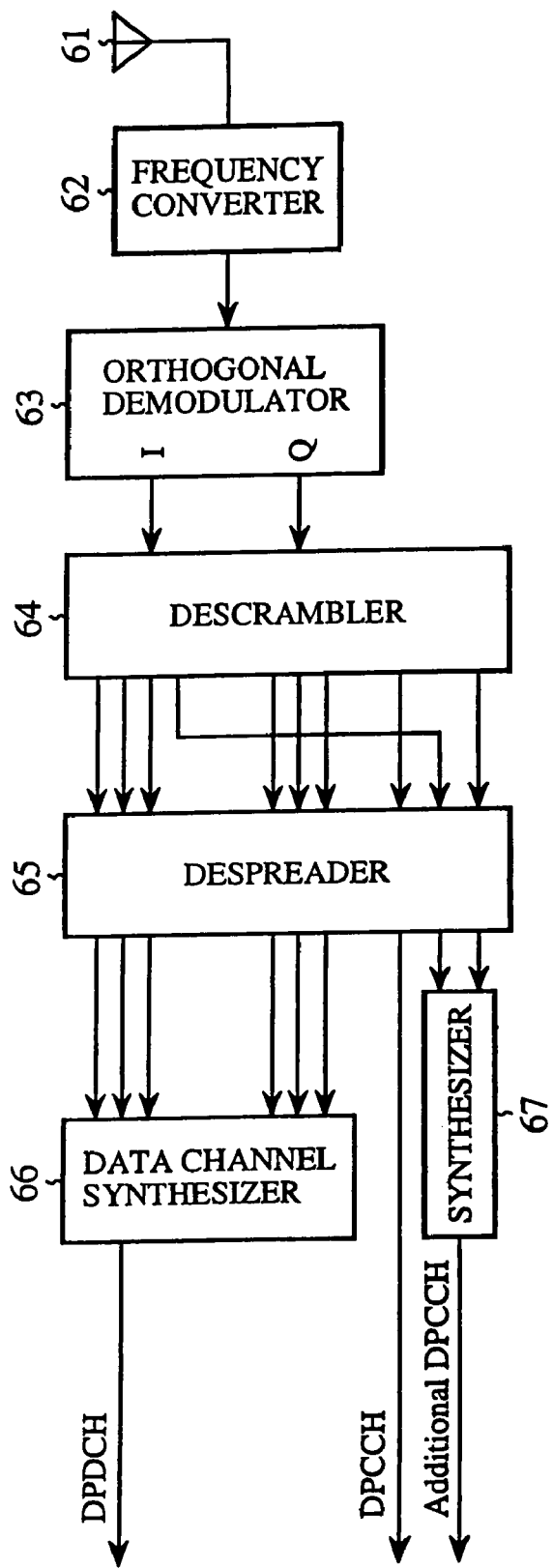
FIG. 8 is a diagram showing a configuration of a base station applicable to a communication system according to the first embodiment of the present invention.

FIG. 8 is a diagram showing a configuration of a base station applicable to the communication system according to the first embodiment of the present invention. In FIG. 8, reference number 61 designates an antenna for receiving the radio frequency signal transmitted from the mobile station 2, and 62 denotes a frequency converter for converting in frequency the radio frequency signal received through the antenna 61 to a base band signal and outputting the obtained base band signal. Reference number 63 indicates an orthogonal demodulator for performing orthogonal demodulation for the base band signal transmitted from the frequency converter 62 and outputting a complex signal (I signal and Q signal).

The receiving means consists of the antenna 61, the frequency converter 62, and the orthogonal demodulator 63.

Reference number 64 designates a descrambler for multiplying the complex signal (I signal and Q signal) transmitted from the orthogonal demodulator 63 by an identification code to identify the mobile station 2 from other mobile stations. Reference number 65 indicates a despreader for multiplying the output signal from the descrambler 64 by a spreading code for use in channel separation in order to separate data of each channel. Reference number 66 designates a data channel synthesizer for synthesizing the data DPDCH1-DPDCH6 for the data channels in order to reconstruct the data DPDCH of the dedicated data channel. Reference number 67 indicates a synthesizer for synthesizing the control data ADPCCH for the control channel distributed on I axis and Q axis.

The IQ separation means consists of the descrambler 64, the despreader 65, the data channel synthesizer 66, and the synthesizer 67.

Figure 9:
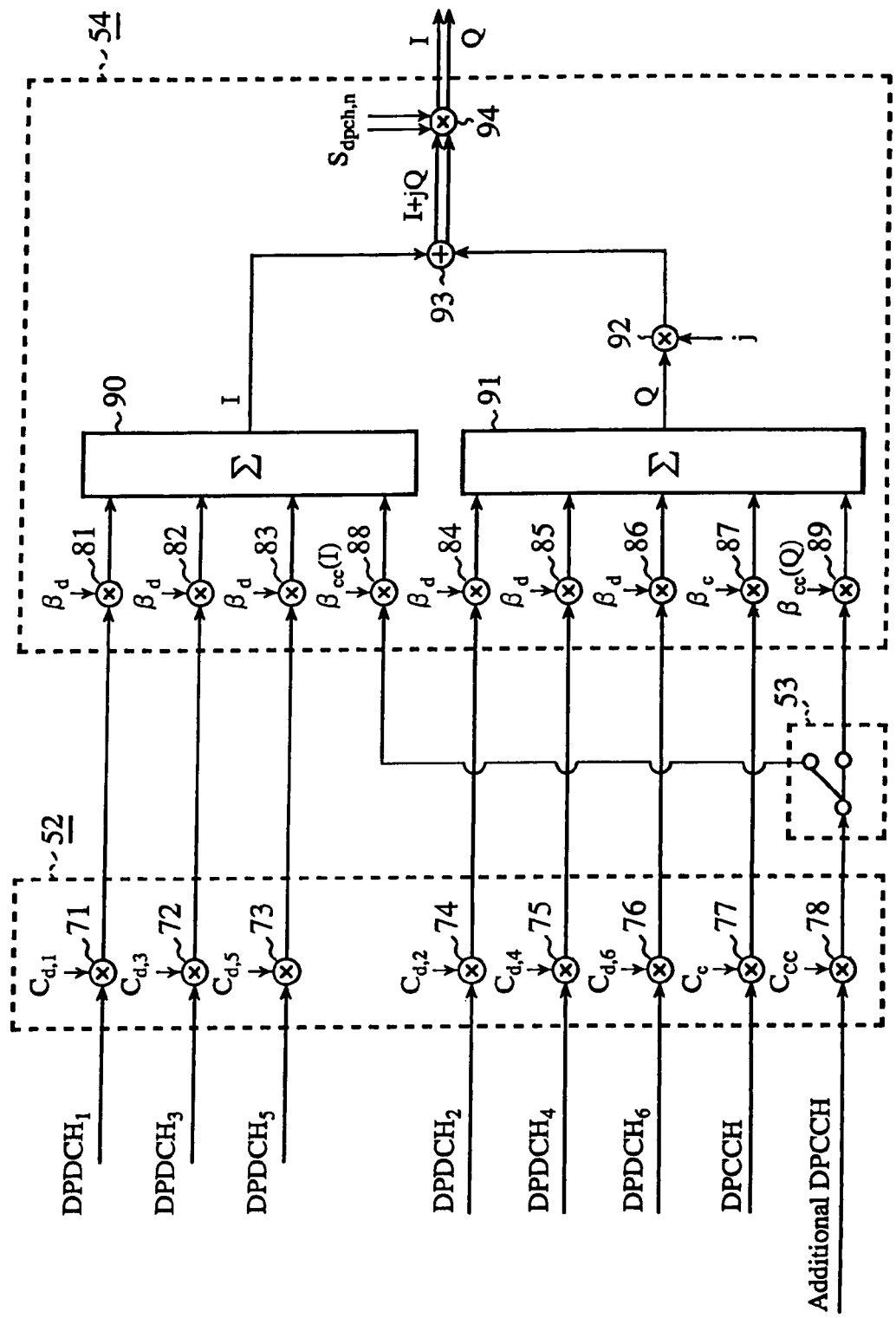
FIG. 9 is a diagram showing an internal configuration of a spreader, a distributor, and a scrambler.

FIG. 9 is a diagram showing an internal configuration of the spreader 52, the distributor 53, and the scrambler 54. In FIG. 9, reference numbers 71 to 76 designate multipliers for multiplying the data DPDCH1-DPDCH6 output from the distributor 51 by spreading codes Cd,1 to Cd,6 for use in channel separation. Reference number 77 denotes a multiplier for multiplying the control data DPCCH for the control channel by the spreading code Cc for use in channel separation. Reference number 78 designates a multiplier for multiplying control data ADPCCH for an additional control channel to be newly added by a spreading code Ccc for use in channel separation. Reference numbers 81 to 86 denote multipliers for multiplying the output signals from the multipliers 71 to 76 by an amplitude coefficient βd for the data DPDCH, 87 indicates a multiplier for multiplying the output signal from the multiplier 77 by an amplitude coefficient βc for the data DPCCH, and 88 and 89 designate multipliers for multiplying the output signal from the distributor 53 by the amplitude coefficient βcc for use in the control data ADPCCH.

Reference number 90 designates an adder for adding the output signals from the multipliers 81-83 and 88. Reference number 91 designates an adder for adding the output signals from the multipliers 84-87 and 89.

Reference number 92 designates a multiplier for multiplying the output signal from the adder 91 by imaginary number "j", 93 denotes an adder for adding the output signal from the adder 90 and the output signal from the multiplier 92 together.

Reference number 94 indicates a multiplier for multiplying the output signal from the adder 93 by an identification code Sdpch,n to identify one mobile station from others, and then outputting the generated complex signal (I signal, Q signal).

Figure 10:
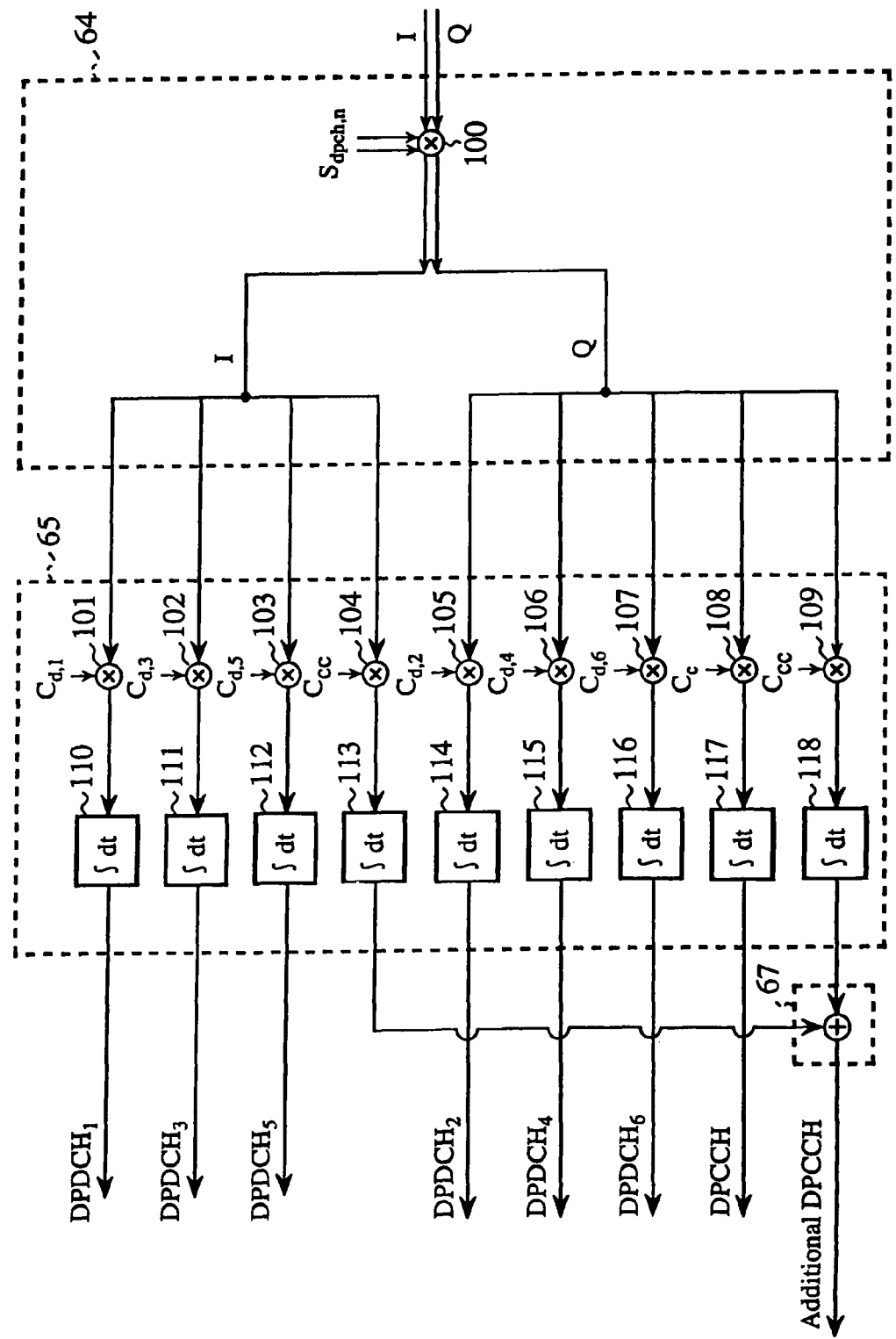
FIG. 10 is a diagram showing an internal configuration of a descrambler, a despreader, and a synthesizer.

FIG. 10 is a diagram showing an internal configuration of the descrambler 64, the despreader 65, and the synthesizer 67. In FIG. 10, reference number 100 designates multipliers for multiplying the complex signal (I signal and Q signal) output from the descrambler 64 by the identification code Sdpch,n. Reference numbers 101-104 denote multipliers for multiplying the I signal output from the descrambler 64 by each spreading code Cd,1, Cd,3, Cd,5, and Ccc for use in channel separation.

Reference numbers 105-109 indicate multipliers for multiplying the Q signal output from the descrambler 64 by each of spreading codes Cd,2, Cd,4, Cd,6, Cc, and Ccc for use in channel separation. Reference number 110-118 designate integrators for integrating in time the output signals from the multipliers 101-119 along the time length of the spreading code.

Figure 11:
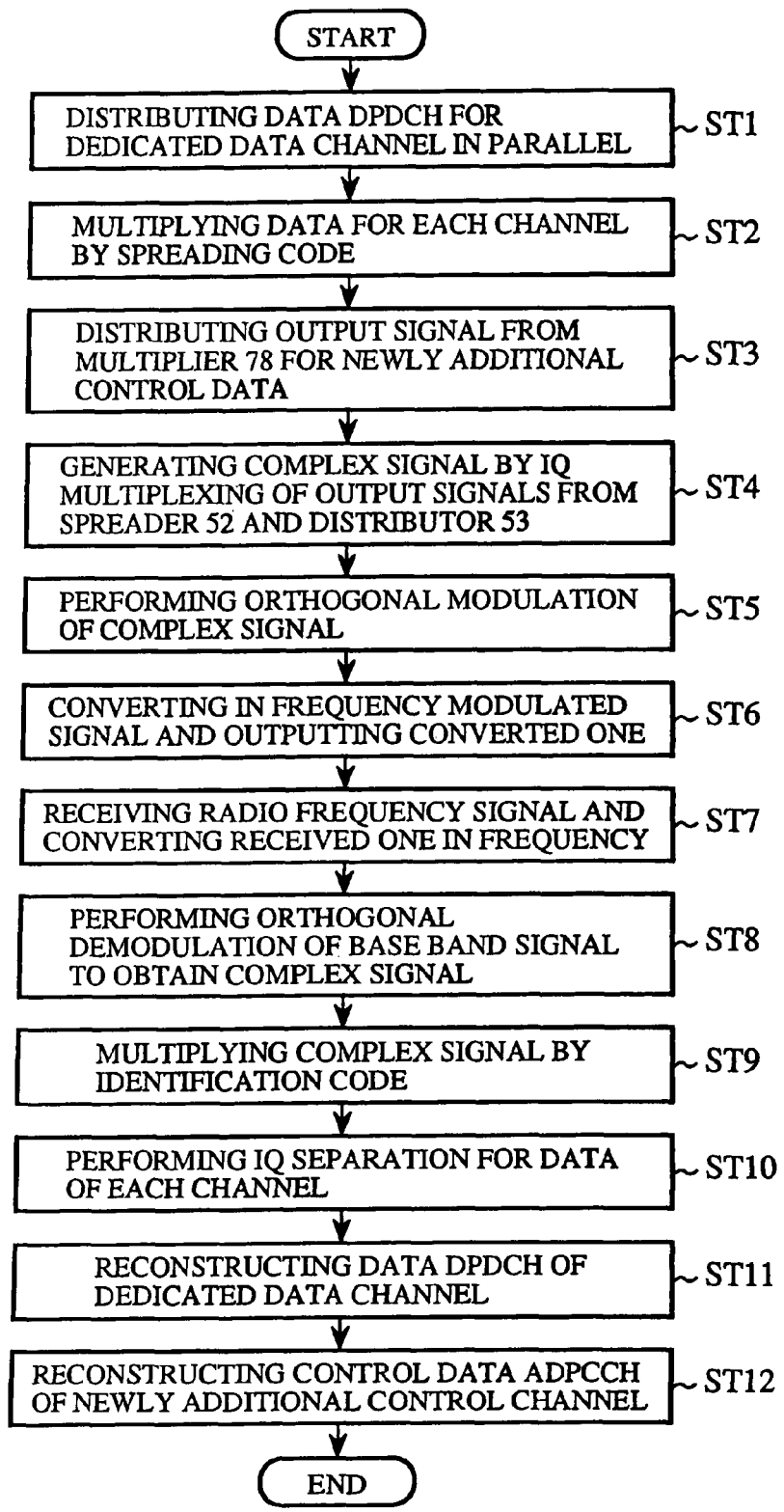
FIG. 11 is a flowchart showing a communication method according to a first embodiment of the present invention.

FIG. 11 is a flowchart showing a communication method according to the first embodiment of the present invention.

Next, a description will be given of the operation to transmit data from the mobile station 2 to the base station 1, where the data include the data of six data channels and the control data of two control channels, for brief explanation.

First, the distributor 51 in the mobile station 2 distributes the data DPDCH for the dedicated data channel in parallel, and outputs the data DPDCH1-DPDCH6 for plural data channels (Step ST1).

When the distributor 51 outputs the data DPDCH1-DPDCH6 for the plural data channels, the spreader 52 performs the spread spectrum by multiplying the data DPDCH1-DPDCH6 for the plural data channels and the control data DPCCH and ADPCCH for the control data channels by spreading codes (Step ST2).

That is, the multipliers 71-76 in the spreader 52 multiply the data DPDCH1-DPDCH6 for the plural data channels output from the distributor 51 by the spreading codes Cd,1-Cd,6 for use in channel separation.

The multiplier 77 in the spreader 52 multiplies the control data DPCCH for the control channel by the spreading code Cc for use in channel separation. The multiplier 78 in the spreader 52 multiplies the control data ADPCCH for the additional control channel to be newly added by the spreading code Ccc for use in channel separation.

The distributor 53 distributes the output data from the multiplier 78 to the multipliers 88 and 89 in the scrambler 54 after the multiplier 78 in the spreader 52 multiplies the control data ADPCCH for the additional control channel by the spreading code Ccc for use in channel separation (Step ST3).

The distribution ratio for the multipliers 88 and 89 performed by the scrambler 54 is 1:1 in this example. However, it is possible to determine another distribution ratio based on signal powers of I axis and Q axis.

The scrambler 54 performs IQ multiplexing of the output signal in order to generate the complex signal (I signal and Q signal) (Step ST4).

That is, the multipliers 81-86 in the scrambler 54 multiply the output signals from the multipliers 71-76 by the amplitude coefficient βd for the data DPDCH. The multiplier 87 in the scrambler 54 multiplies the output signal from the multiplier 77 by the amplitude coefficient βc for the data DPCCH.

The multiplier 88 in the scrambler 54 multiplies the output signal from the distributor 53 by the amplitude coefficient βcc(I) for the data ADPCCH. The multiplier 89 in the scrambler 54 multiplies the output signal from the distributor 53 by the amplitude coefficient βcc(Q) for the data ADPCCH.

By the way, the amplitude coefficients βcc(I) and βcc(Q) for the control data ADPCCH are determined in accordance with the signal powers of I axis and Q axis. That is, they are determined so that the signal power of I signal becomes equal to the signal power of the Q signal, both the signal powers will be output from the scrambler 54.

Figure 12:
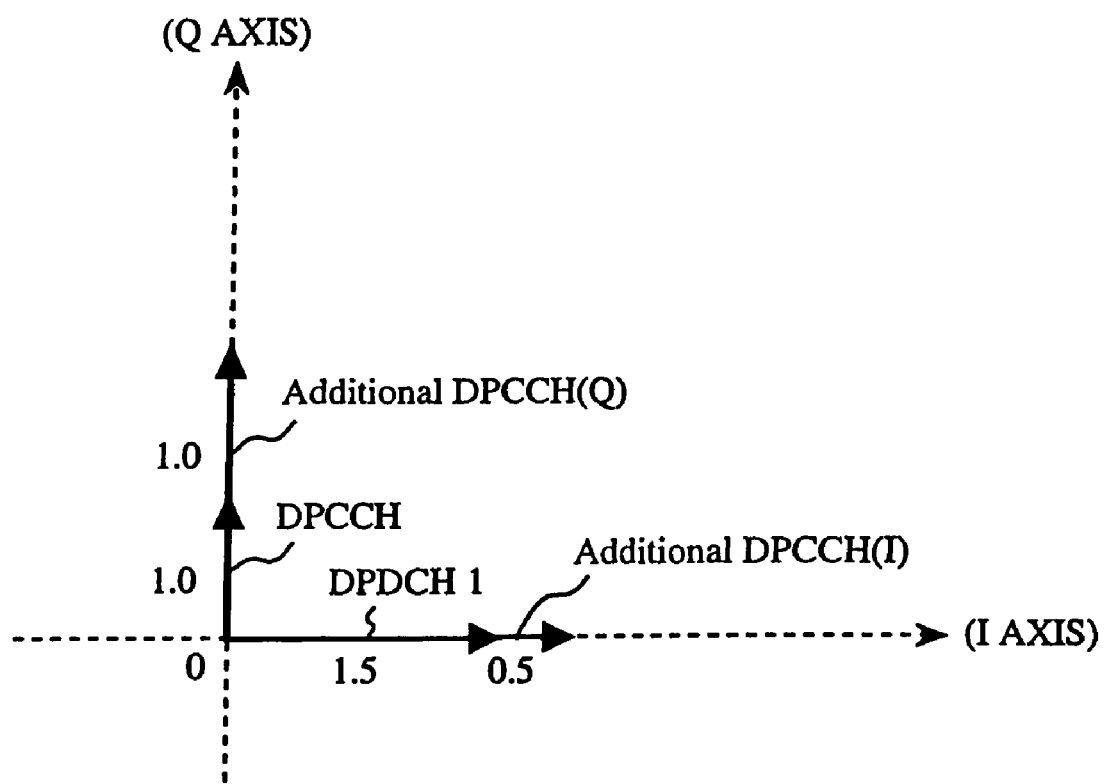
FIG. 12 is a diagram showing a complex plane in case of one data channel.

In this example, FIG. 12 shows the complex plane of one data channel. For example, when the signal power of the data DPDCH1 is "1.5" and the signal power of the control data DPCCH is "1.0", the amplitude coefficients βcc(I) and βcc(Q) are determined so that the signal power of the control data ADPCCH(I) in I axis becomes "1.0" and the signal power of the control data ADPCCH(Q) in Q axis becomes "0.5".

Next, the adder 90 in the scrambler 54 adds the output signals from the multipliers 81-83 and 88 together, and the adder 91 in the scrambler 54 adds the output signals from the multipliers 84-87 and 89 together.

The multiplier 92 in the scrambler 54 multiplies the output signal from the adder 91 by imaginary number "j" in order to assign the output signal from the adder 91 on Q axis.

Next, the adder 93 in the scrambler 54 adds the output signals from the adder 90 and the multiplier 92, and the multiplier 94 in the scrambler 54 multiplies the output signal from the adder 93 by the identification code Sdpch,n in order to output the complex signal (I signal and Q signal).

When receiving the complex signal (I signal and Q signal) from the scrambler 54, the modulator 55 performs orthogonal modulation for the received complex signal (I signal and Q signal) in order to generate the modulated signal. (Step ST5).

When the modulator 55 generates the modulated signal, the frequency converter 56 converts in frequency the modulated signal to the radio frequency signal, and outputs the converted one to the antenna 57 (Step ST6). Through the antenna 57 the radio frequency signal is transmitted to the base station 1.

When receiving the radio frequency signal transmitted from the mobile station 2 through the antenna 61, the frequency converter 62 in the base station 1 converts in frequency the received one in order to generate the base band signal (Step ST7).

When receiving the base band signal from the frequency converter 62, the orthogonal demodulator 63 performs orthogonal demodulating for the base band signal in order to generate the complex signal (I signal and Q signal) (Step ST8).

When receiving the complex signal (I signal and Q signal) from the orthogonal demodulator 63, the descrambler 64 multiplies the received complex signal (I signal and Q signal) by the identification code in order to distinguish the target mobile station from other stations (Step ST9). That is, the multiplier 100 in the descrambler 64 multiplies the complex signal (I signal and Q signal) output from the orthogonal demodulator 63 by the identification code Sdpch,n for the mobile station identification.

The despreader 65 multiplies the output signal from the descrambler 64 by the spreading code for channel separation in order to separate the data of each channel (Step ST10). That is, the multipliers 101-104 in the despreader 65 multiply the I signal output from the descrambler 64 by the spreading codes Cd,1, Cd,3, Cd,5, and Ccc. The multipliers 105-109 in the despreader 65 multiply the Q signal output from the descrambler 64 by the spreading codes Cd,2, Cd,4, Cd,6, Cc, and Ccc for channel separation.

The integrators 110-118 in the despreader 65 integrate the output signals from the multipliers 101-109 along the spreading code time length in order to reconstruct the data DPDCH1-DPDCH6 for the data channels and the control data DPCCH for the control channel.

The data channel synthesizer 66 synthesizes the data DPDCH1-DPDCH6 for the data channels in order to reconstruct the data DPDCH for the dedicated data channel (Step ST11).

The adder 67 adds the output signals from the integrators 113 and 118 in the despreader 65, so that the control data ADPCCH for the additional control channel to be newly added can be reconstructed (Step ST12).

As has been apparently understood by the above description, according to the first embodiment, when the scrambler 54 performs IQ multiplexing of the output signals of the spreader 52 and the distributor 53 in order to generate the complex signal (I signal and Q signal), the amplitude coefficients βcc(I) and βcc(Q) for the data ADPCCH are determined in accordance with the signal powers of I axis and Q axis. It is thereby possible to suppress a distortion caused in the amplifier in the frequency converter 56, so that the occurrence of jamming in the adjacent frequency band can be suppressed.

The first embodiment has designed to allocate the six data channels. The present invention is not limited by this case, when the allocated number of data channels is not more than five, the data DPDCH1 is firstly assigned on I axis/Q axis and the remained data are then assigned on I axis/Q axis in order. That is, no process for unnecessary data channel is performed. The allocated number of the data channels is determined based on necessary communication service such as a communication speed.

Second Embodiment

Figure 13:
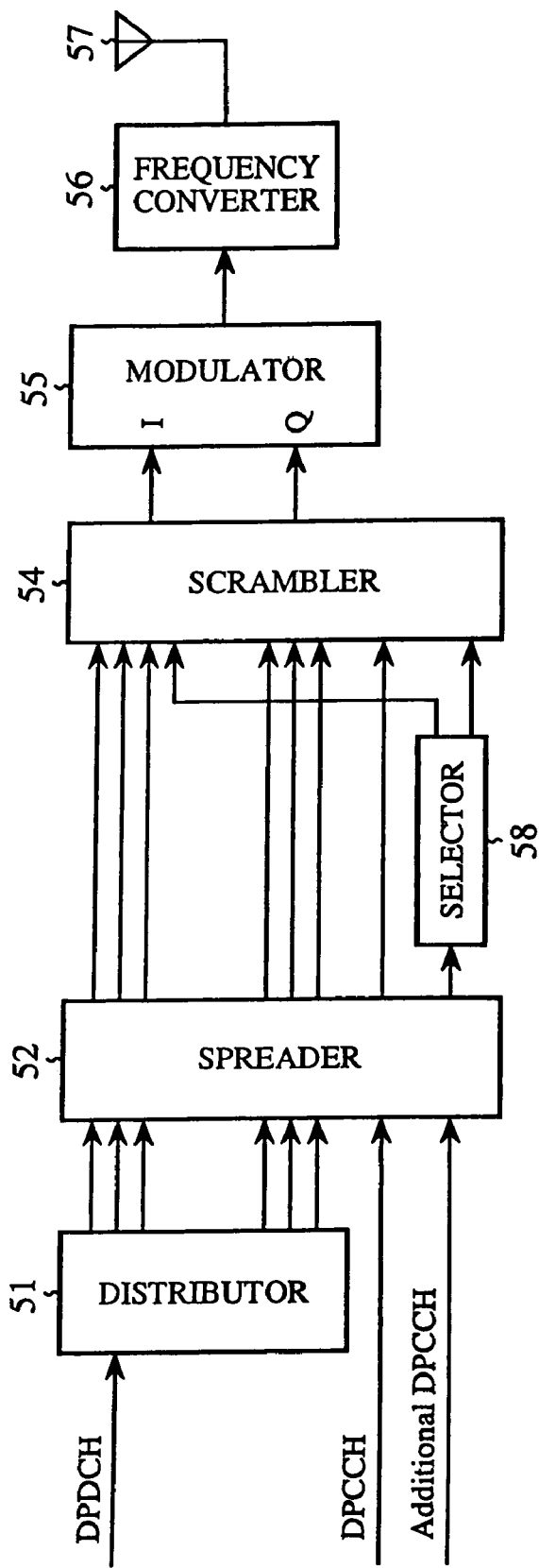
FIG. 13 is a diagram showing a configuration of a mobile station applicable to a communication system according to a second embodiment of the present invention.
Figure 14:
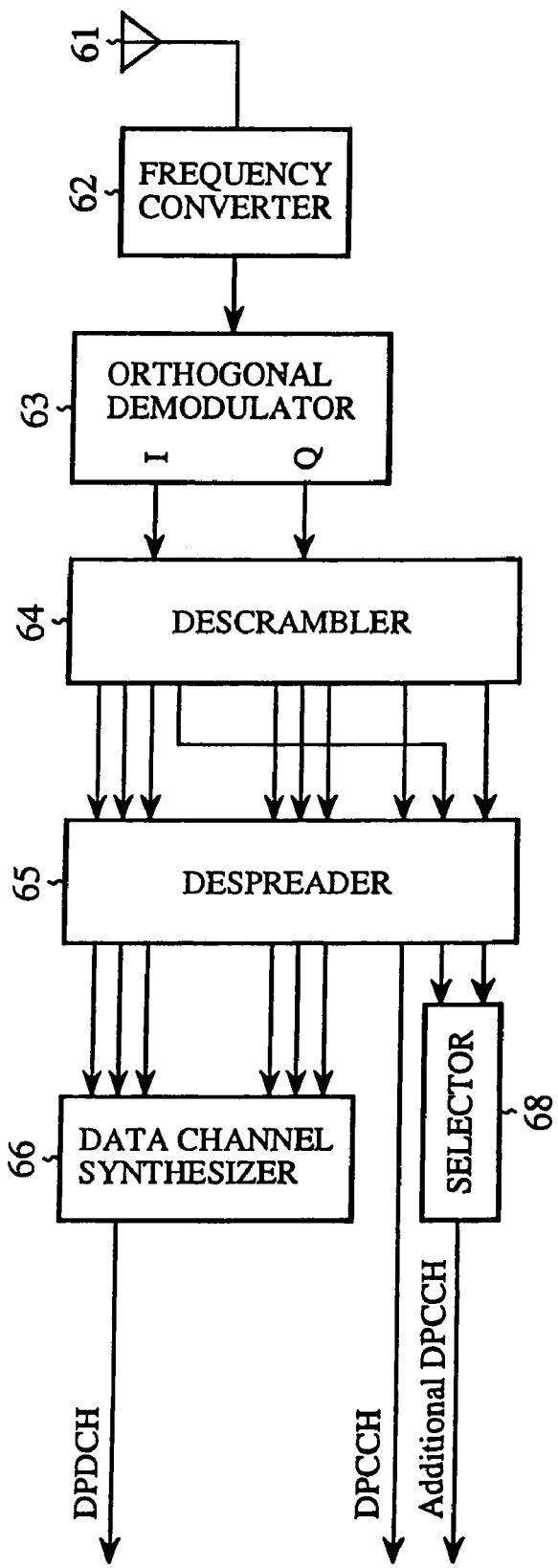
FIG. 14 is a diagram showing a configuration of a base station applicable to a communication system according to the second embodiment of the present invention.

FIG. 13 is a diagram showing a configuration of a mobile station applicable to a communication system according to a second embodiment of the present invention. FIG. 14 is a diagram showing a configuration of a base station which is applicable to the communication system according to the second embodiment of the present invention. In those FIGS. 13 and 14, the same components of the first embodiment shown in FIGS. 7 and 8 will be referred with the same reference numbers and the explanation of them is omitted here.

Reference number 58 designates a selector (IQ multiplexing means) for outputting the control data ADPCCH for the control channel after spread spectrum to one of the multipliers 88 and 89 in the scrambler 54. Reference number 68 designates a selector (IQ separation means) for inputting and then outputting the control data ADPCCH for the control channel transferred from one of the integrators 113 and 118 in the descrambler 64.

The first embodiment has previously described the case in which the distributor 53 distributes the output signals from the multiplier 78 in the spreader 52 to the multipliers 88 and 89 in the scrambler 54, and the multipliers 88 and 89 in the scrambler 54 multiply the output signal from the distributor 53 by the amplitude coefficients βcc(I) and βcc(Q) so that the signal power of I signal becomes equal to the signal power of Q signal. In the second embodiment it is possible that the selector 58 outputs the output signal of the multiplier 78 in the spreader 52 to the multipliers 88 or 89 in the scrambler 54 in consideration of the signal powers of I axis and Q axis in order to assign the control data ADPCCH for the control channel to one axis of a smaller signal power in I axis and Q axis.

Figure 15:
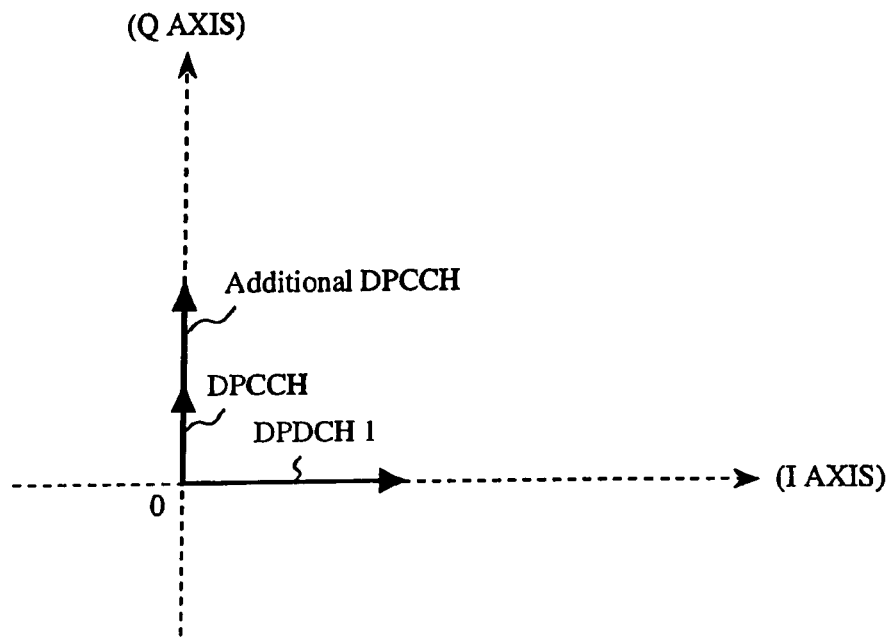
FIG. 15 is a diagram showing a complex plane in case of one data channel.
Figure 16:
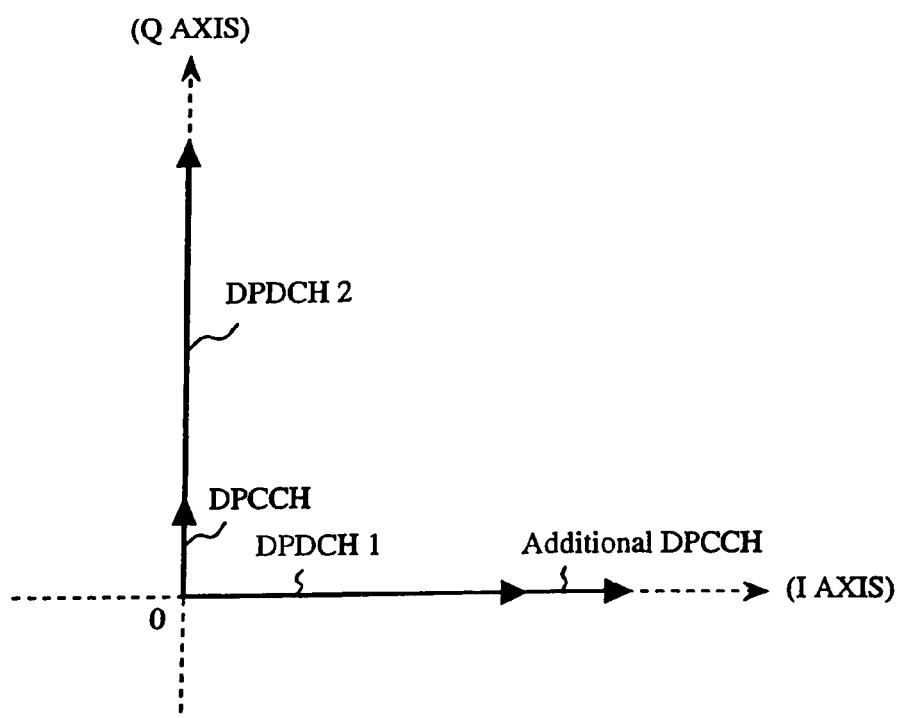
FIG. 16 is a diagram showing a complex plane in case of two data channels.

That is, TS25.213 as 3GPP standard has defined that data of data channel are assigned on I axis when the set number of data channels is one (see FIG. 15), and data for each data channel are assigned on I axis and Q axis when two (see FIG. 16). That is, the data of the data channels are assigned on I axis and Q axis, alternately.

In the second embodiment, in order to keep the balance of the signal power of I axis and the signal power of Q axis, the selector 58 in the mobile station 2 outputs the output data of the multiplier 78 to the multiplier 89 in the scrambler 54 when the set number of the data channels is an odd number so that the control data ADPCCH of the control channel are assigned on Q axis.

In order to obtain the control data ADPCCH of the control channel assigned on Q axis, the selector 68 in the base station 1 inputs the control data ADPCCH of the control channel transferred from the integrator 118 in the descrambler 64 and outputs the control data ADPCCH.

On the other hand, the selector 58 in the mobile station 2 outputs the output data of the multiplier 78 in the spreader 52 to the multiplier 88 in the scrambler 54 when the set number of the data channels is an even number so that the control data ADPCCH of the control channel are assigned on I axis.

In order to obtain the control data ADPCCH of the control channel assigned on I axis, the selector 68 in the base station 1 inputs the control data ADPCCH of the control channel transferred from the integrator 113 in the descrambler 64 and outputs the control data ADPCCH.

As described above, according to the second embodiment, like the effect of the first embodiment, it is possible to suppress the generation of a distortion in the amplifier in the frequency converter 56 and thereby possible to suppress the occurrence of jamming in the adjacent frequency band, for example.

The above second embodiment has descried the case where the axis on which the control data of the control channel are assigned is determined based on the set number of the data channels. The present invention is not limited by this case, for example, it is possible that the selector 58 in the mobile station 2 determines the axis on which the control data ADPCCH of the control channel are assigned based on the measured signal powers of I axis and Q axis.

Third Embodiment

Figure 19:
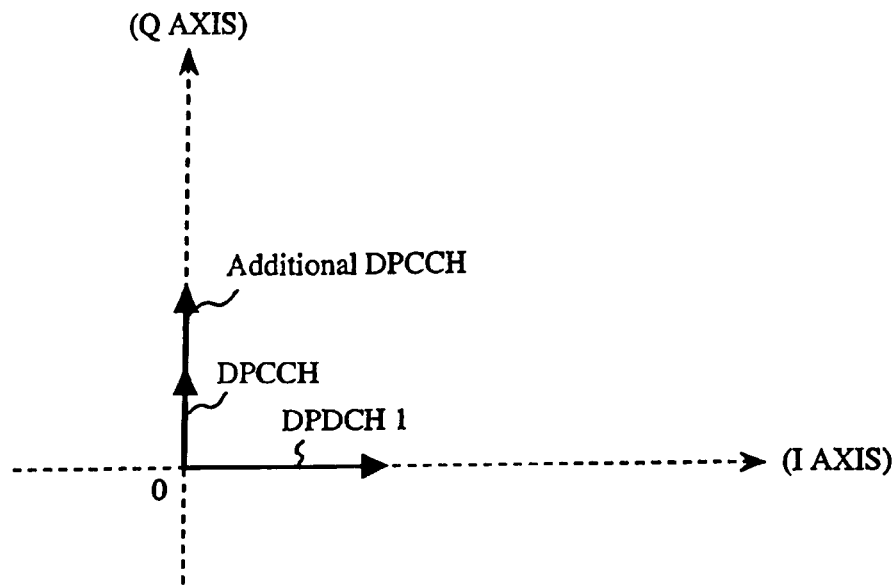
FIG. 19 is a diagram showing a complex plane in case of one data channel.
Figure 20:
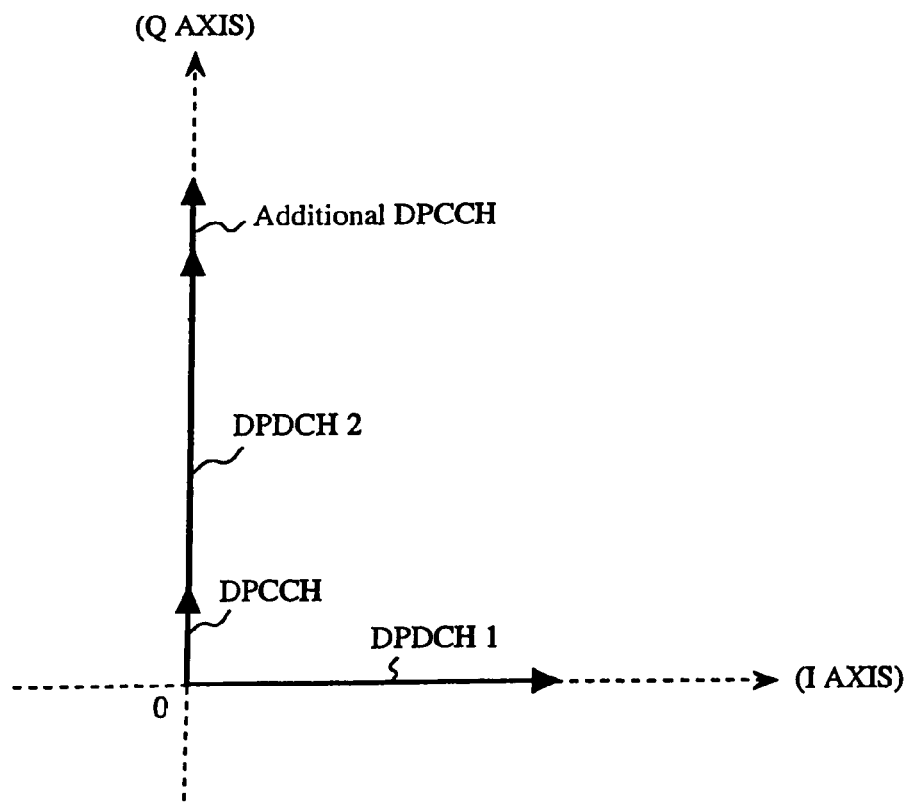
FIG. 20 is a diagram showing a complex plane in case of two data channels.

The second embodiment has shown the case in which the control data ADPCCH of the control channel are assigned on one axis of a smaller signal power in I axis and Q axis. Like the third embodiment, it is possible to assign the control data ADPCCH of the control channel only on Q axis, as shown in FIG. 19 and FIG. 20.

That is, it can be considered that a spreading code length of the control data ADPCCH of the control channel is approximately 256 which is almost equal to the length of the control data DPCCH of the control channel.

Accordingly, the signal power of the control data ADPCCH of the control channel is smaller than the signal power of the data DPDCH1 and the like of the data channel. Further, in the Internet use, because it can be considered that the amount of data transferred on uplink is smaller than that on downlink, the set number of data channels becomes one in many cases where a link for HSDPA is allocated.

Here, FIG. 21 to FIG. 26 are diagrams showing simulation examples of CCDF (Complimentary Cumulative Distribution Function) characteristic of an output waveform from the scrambler 54 when the control data ADPCCH of the control channel are assigned on I axis or Q axis in various set number of the data channels (using "N" in those figures).

In FIG. 21 to FIG. 26, reference character "I" designates the CCDF characteristic when the control data ADPCCH are assigned on I axis, and reference character "Q" denotes the CCDF characteristic when the control data ADPCCH are assigned on Q axis.

The CCDF characteristic shows the ratio (percentage %) that a momentary power is in time over an average power. The CCDF characteristic is more shifted right, the above ratio becomes greater (having a large fluctuation in power). That is, it means that the ratio to take the momentary power of a larger value when compared with the average power becomes large. For example, when the set number of the data channels is one (N=1) and the control data ADPCCH of the control channel are assigned on Q axis, the time ratio to take the momentary power approximately greater by 3.5 dB of the average power becomes 0.1 percentage (%).

In general, a distortion often occurs in the amplifier when a signal of a larger fluctuation is input. In order to avoid the occurrence of a distortion, it is required to have the linearity in a large power section. This causes to increase the current consumption.

Figure 21:
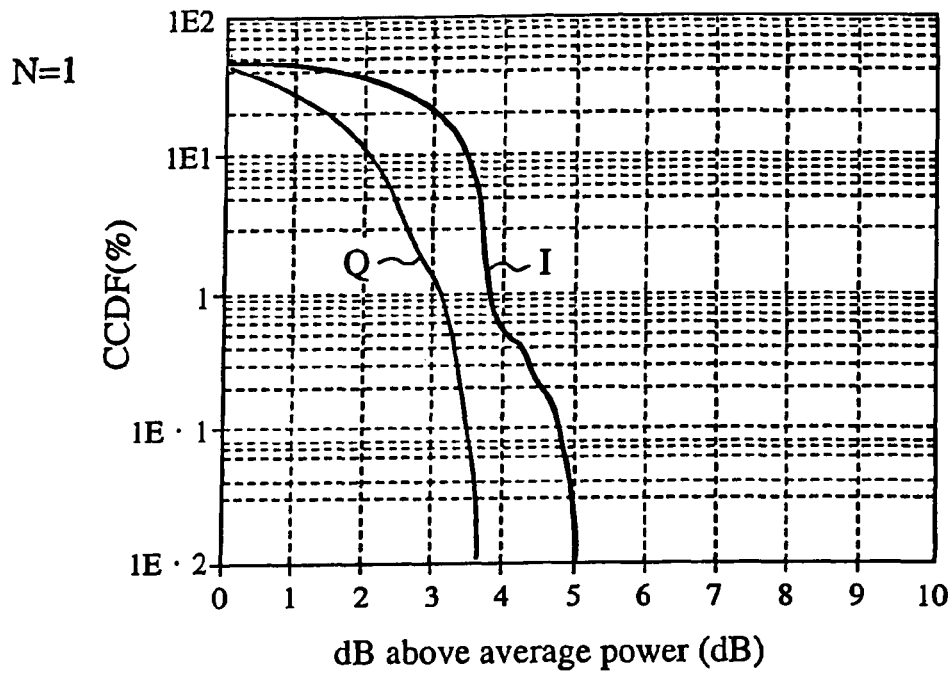
FIG. 21 is a diagram showing CCDF characteristic of a modulated waveform.
Figure 22:
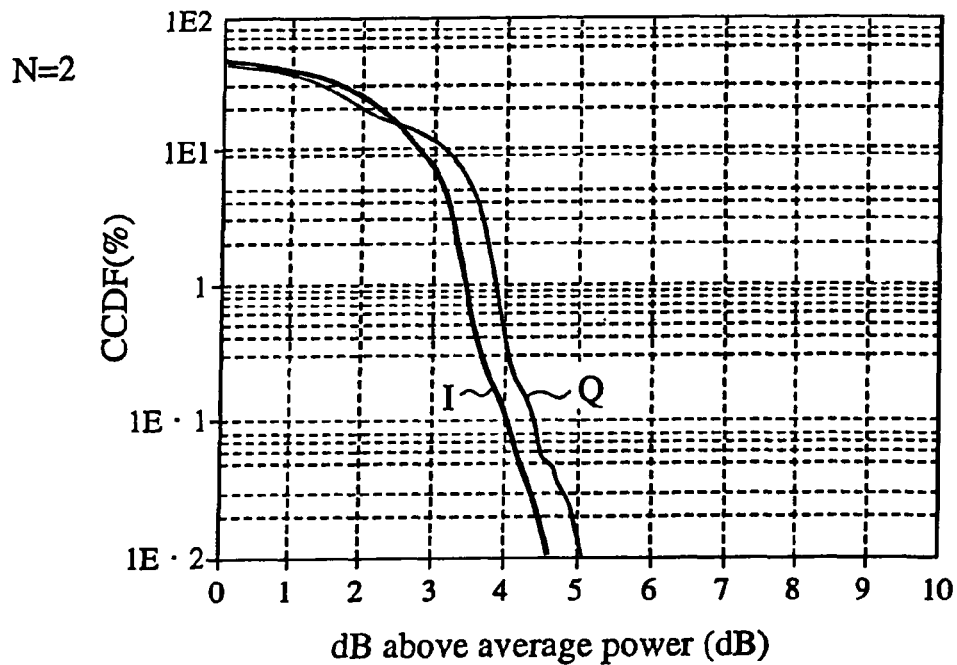
FIG. 22 is a diagram showing CCDF characteristic of a modulated waveform.
Figure 23:
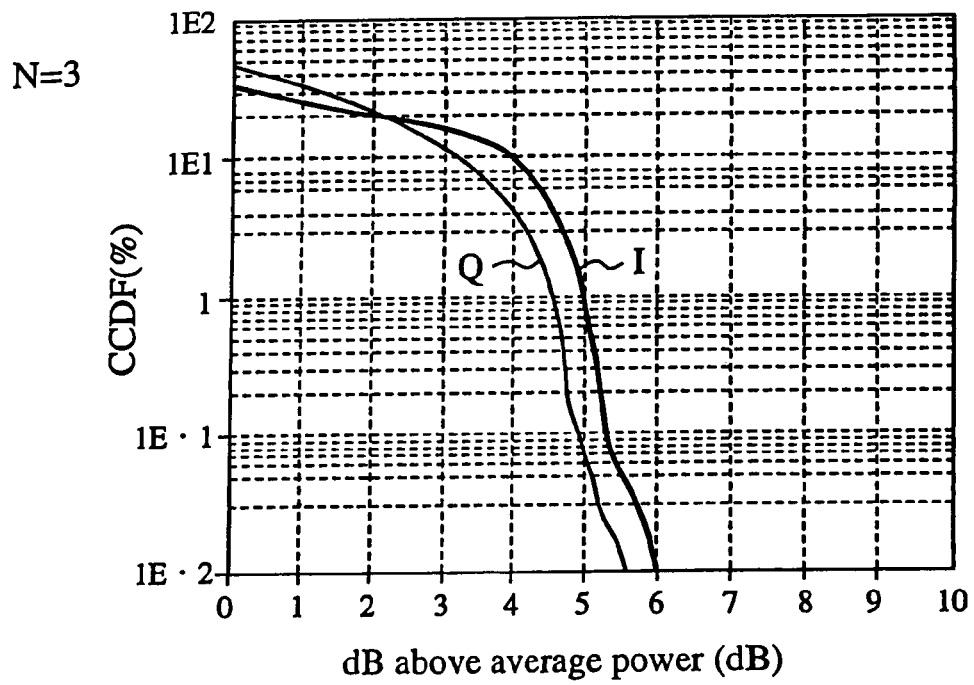
FIG. 23 is a diagram showing CCDF characteristic of a modulated waveform.
Figure 24:
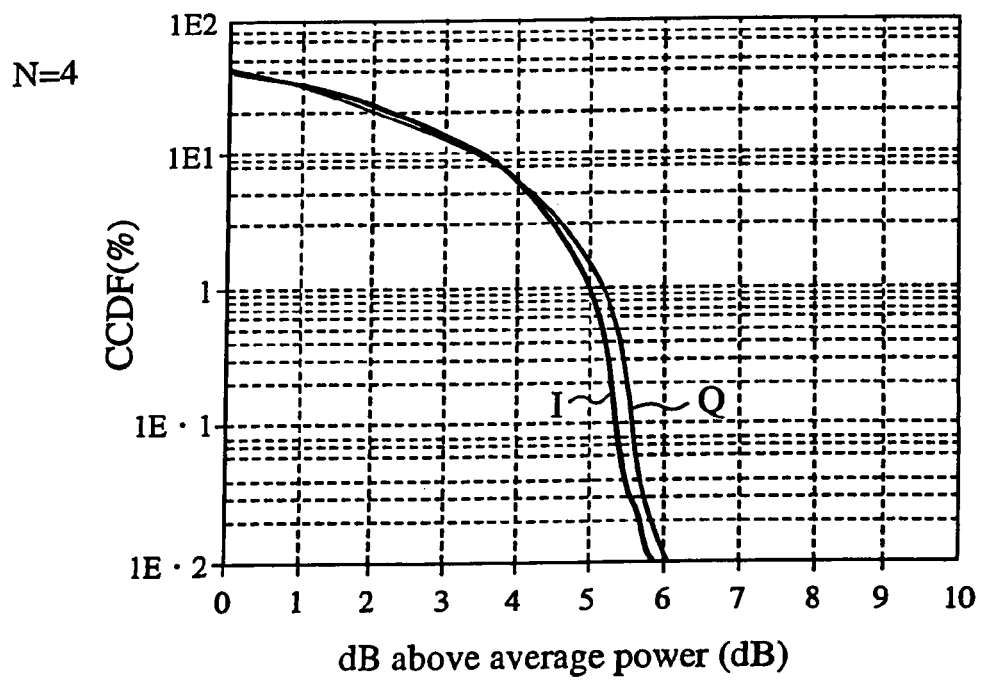
FIG. 24 is a diagram showing CCDF characteristic of a modulated waveform.
Figure 25:
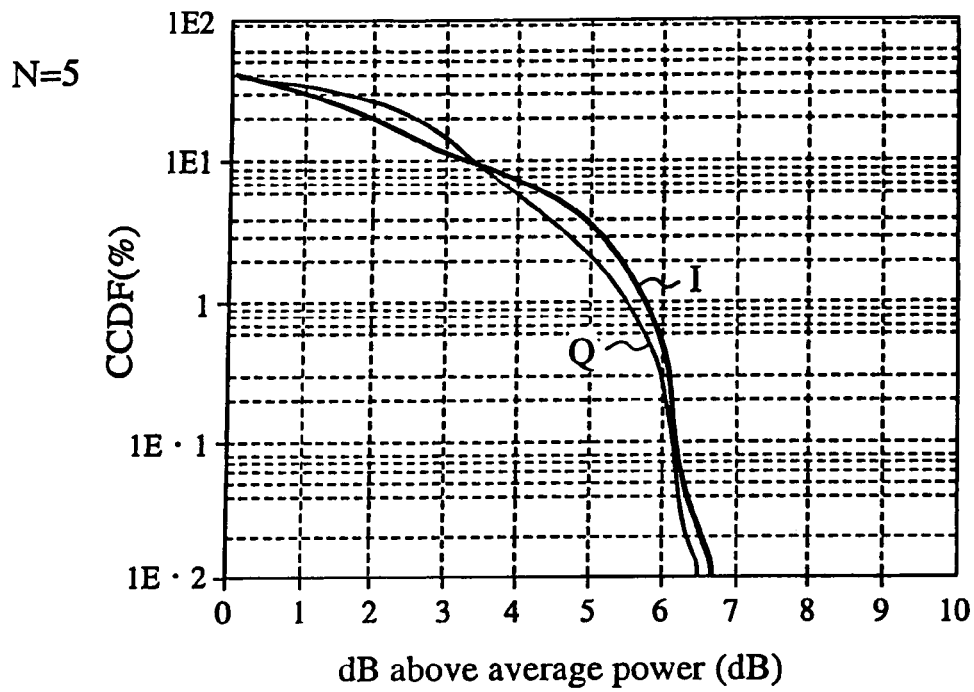
FIG. 25 is a diagram showing CCDF characteristic of a modulated waveform.
Figure 26:
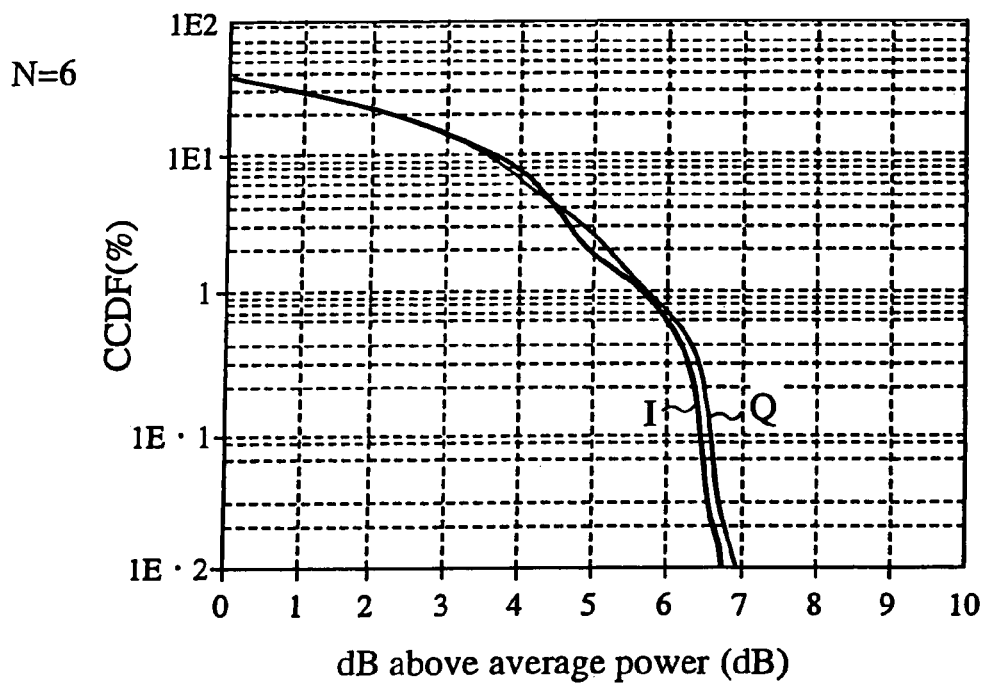
FIG. 26 is a diagram showing CCDF characteristic of a modulated waveform.

As can be understood from FIG. 21, when N=1 (only one data channel DPDCH1), the characteristic is greatly changed according to the use of I axis or Q axis. In this case, the occurrence to generate the distortion is smaller when the control data ADPCCH are assigned on Q axis.

Similarly, the axis to which the data are assigned is switched according to the set number N. It can be understood that the data are assigned on Q axis when N is an odd number, and the data are assigned on I axis when N is an even number, so that the CCDF characteristic becomes good. These results are equal to the results of the second embodiment.

This means that the above assign method is the most effective method to reduce the distortion from the view point of the CCDF characteristic.

It can be understood that when compared with the case of N=1, the case of N>1 takes a small distortion because the difference of the signal powers between I axis and Q axis is not large.

Accordingly, from the view point to keep the balance between the signal powers on I axis and Q axis and the view point of the characteristic of the input signal of the amplifier, there is no problem in practical use even if the control data ADPCCH of the control channel are assigned on Q axis together with the control data DPCCH of the control channel.

Figure 17:
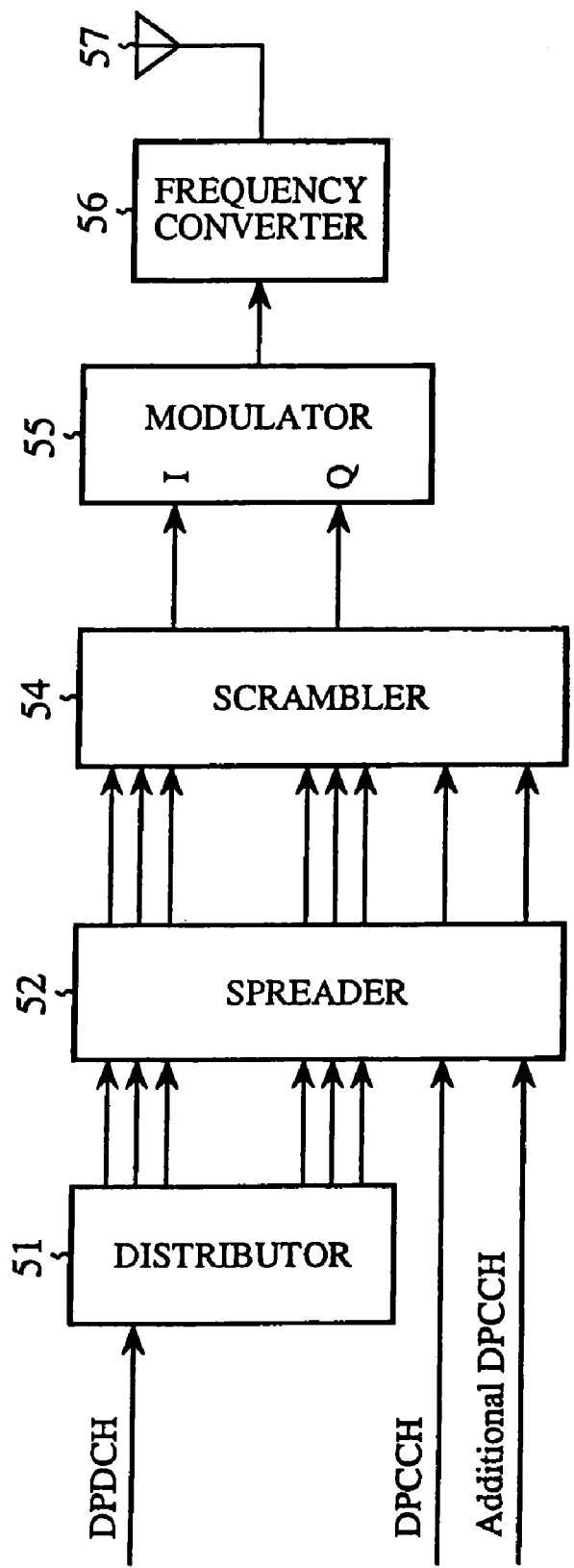
FIG. 17 is a diagram showing a configuration of a mobile station applicable to a communication system according to a third embodiment of the present invention.
Figure 18:
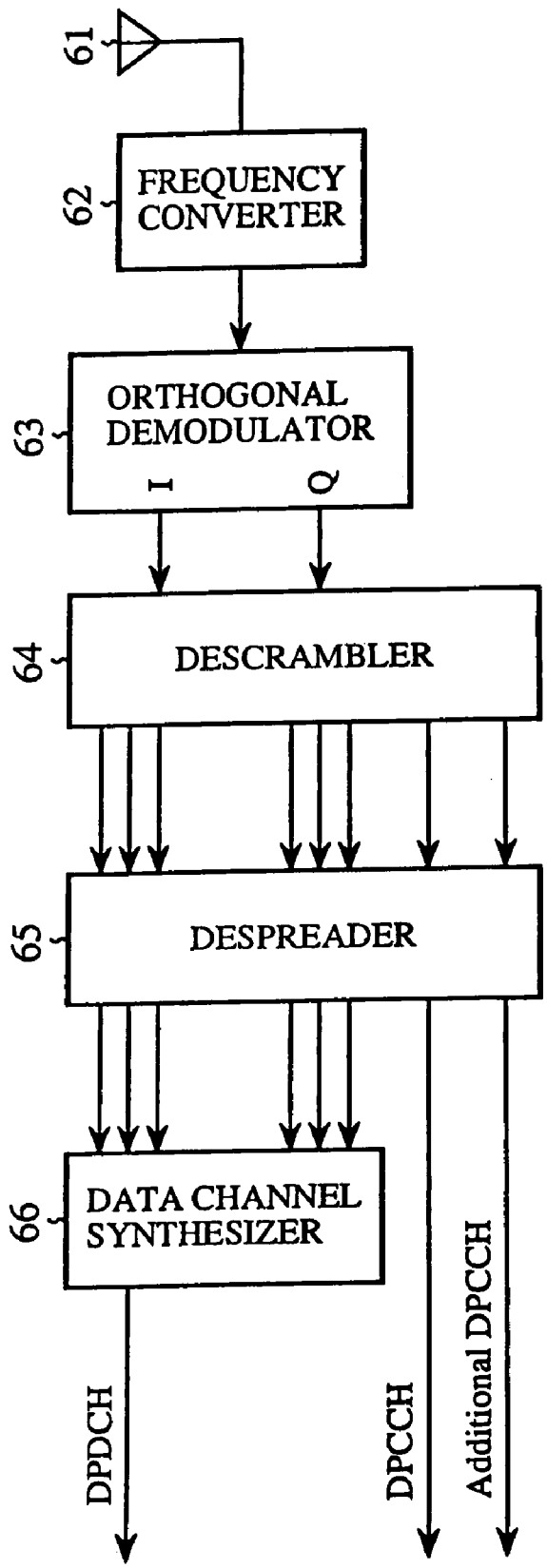
FIG. 18 is a diagram showing a configuration of a base station applicable to a communication system according to the third embodiment of the present invention.

Thus, when the control data ADPCCH of the control channel are always assigned on Q axis, it is possible to eliminate the distributor 53, the synthesizer 67, or selectors 58 and 68, as shown in FIG. 17 and FIG. 18. This can achieve the effect to reduce the configuration and size of the circuit in the mobile station, the base station, and the communication system.

INDUSTRIAL APPLICABILITY

As described above, the mobile station, the base station, the communication system, and the communication method according to the present invention are particularly suitable for high speed data communication to transmit and receive a complex signal in IQ multiplexing.

What is claimed is:

1. An IQ multiplexing device configured to IQ multiplex transmission data for a data channel, control data for a control channel, and additional control data for an additional control channel used for high-speed downlink packet access, and to generate a complex signal, the IQ multiplexing device comprising:
   a first processing device configured to assign the transmission data for the data channel to the I axis and the Q axis, alternatively;
   a second processing device configured to assign the control data for the control channel to the Q axis; and
   a third processing device configured to assign the additional control data for the additional control channel used for high speed downlink packet access to the Q axis independently of a set number for the data channel.

2. An IQ multiplexing method performed on a mobile station of IQ multiplexing transmission data for a data channel, control data for a control channel, and additional control data for an additional control channel used for high-speed downlink packet access, and of generating a complex signal, the IQ multiplexing method comprises:
   assigning the transmission data for the data channel to the I axis and the Q axis, alternatively;
   assigning the control data for the control channel to the Q axis; and
   assigning the additional control data for the additional control channel used for high speed downlink packet access to the Q axis independently of a set number for the data channel.

* * * * *